July 25, 1967 T. E. WEICHSELBAUM ETAL 3,332,289
MEANS FOR MEASURING THE SPECIFIC GRAVITY OF
LIQUIDS AND SOLUTIONS
Original Filed March 28, 1963

INVENTOR.
THEODORE E. WEICHSELBAUM
ANTON J. HORN
BY
ATTORNEY

July 25, 1967   T. E. WEICHSELBAUM ETAL   3,332,289
MEANS FOR MEASURING THE SPECIFIC GRAVITY OF
LIQUIDS AND SOLUTIONS
Original Filed March 28, 1963   2 Sheets-Sheet 2
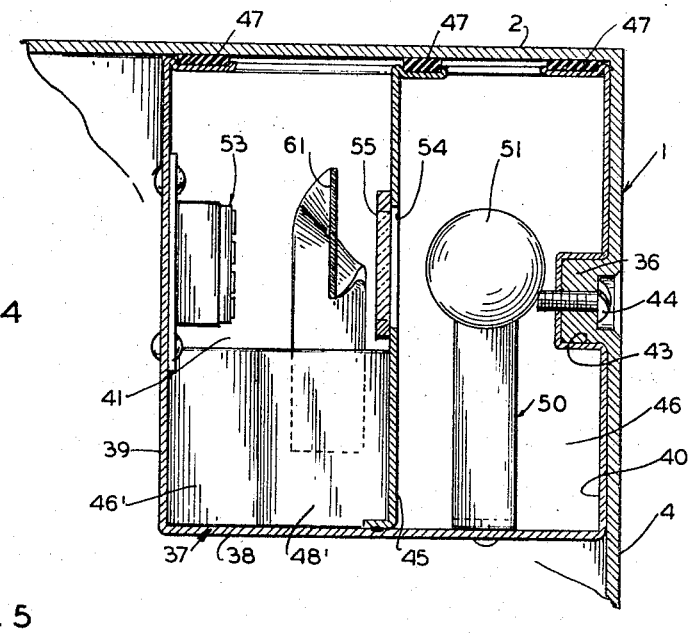
FIG. 4
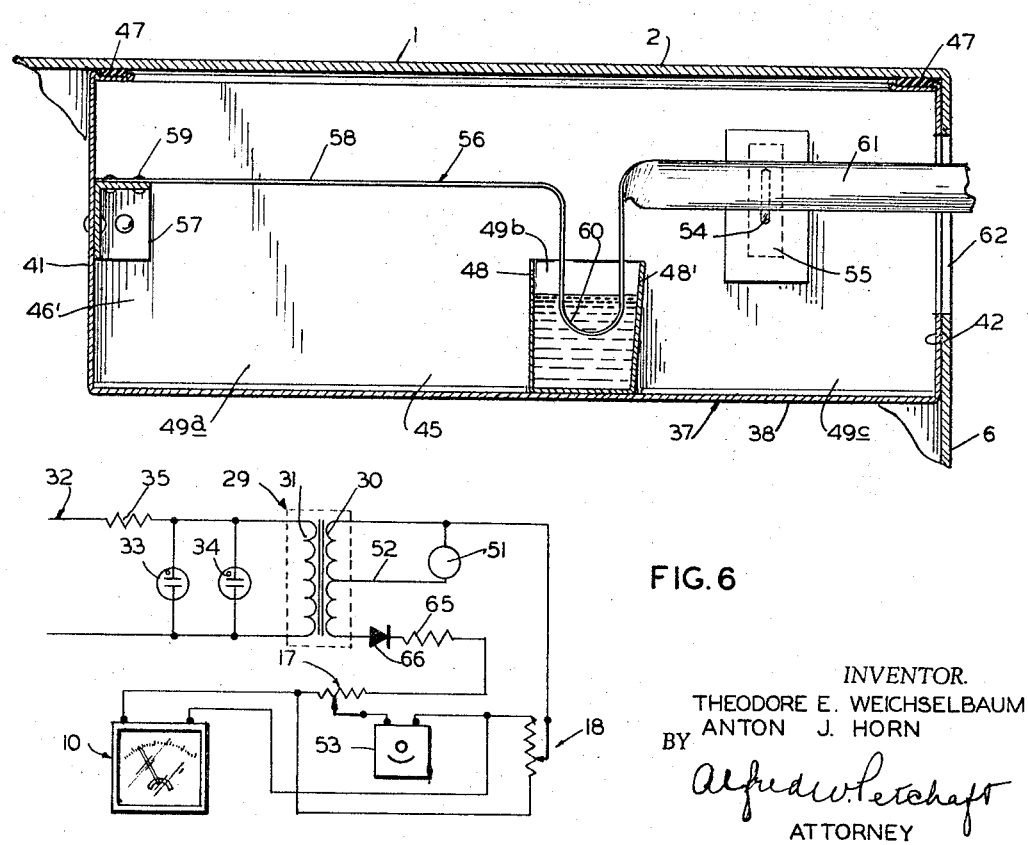
FIG. 5
FIG. 6
INVENTOR.
THEODORE E. WEICHSELBAUM
ANTON J. HORN
BY
ATTORNEY

United States Patent Office 3,332,289
Patented July 25, 1967

3,332,289
MEANS FOR MEASURING THE SPECIFIC GRAVITY OF LIQUIDS AND SOLUTIONS
Theodore E. Weichselbaum, Normandy, and Anton J. Horn, Creve Coeur, Mo., assignors to Brunswick Corporation, a corporation of Delaware
Continuation of application Ser. No. 268,659, Mar. 28, 1963. This application Mar. 31, 1966, Ser. No. 539,018
6 Claims. (Cl. 73—451)

ABSTRACT OF THE DISCLOSURE

A specific gravity measuring device having a bob suspended from a cantilever beam into a self leveling vial holding a liquid to be measured. The beam forms a shutter for varying the area of a photoelectric cell which is exposed to a constant intensity light source in proportion to the movement of the bob. The electrical output from the photoelectric cell is read on a meter directly in specific gravity.

---

This application is a continuation application of United States patent application, Ser. No. 268,659, filed Mar. 28, 1963 for a Means for Measuring the Specific Gravity of Liquids and Solutions.

This invention relates in general to certain new and useful improvements in devices for determining certain physical properties of liquids and, more particularly, to an improved type of device for measuring the specific gravity thereof.

The hydrometer is one of the most commonly used devices for determining the specific gravity of liquids, and finds extensive use in industrial operations. However, a single hydrometer, in itself, is limited in range and is relatively inaccurate. Therefore, it is often necessary to resort to a set of hydrometers to cover a wide range of gravities. Moreover, hydrometers are somewhat difficult to read with precision and such readings are highly susceptible to human error. Consequently, other devices, such as the Westphal balance and the so-called "falling drop" apparatus have been developed but such apparatus is also subject to a large measure of human error. In addition to this, such apparatus involves rather time-consuming procedures and in many instances some mathematical computations must be applied to the results in order to obtain specific gravity.

Attempts have been made in the weighing arts to solve this problem by using in combination with a balanced beam scale a light source, a photoelectric cell, a slit and an iris. The iris shape is designed to compensate for non-linear characteristics of the photoelectric cell. Part of the non-linear effect also comes from the different rates of movement of the balance beam as it approaches equilibrium. Such a device is shown and described in Japanese Patent No. 481,594, issued Oct. 3, 1958 to Kiyoshi Takemura and Hideo Mishima. The non-linear characteristics of the just enumerated system required careful adjustment and a relatively complicated circuit.

It is, therefore, the primary object of the present invention to provide a device for directly measuring the specific gravity of liquids and solutions in a rapid efficient and accurate manner.

It is another object of the present invention to provide a device of the type stated for measuring specific gravity of liquids and solutions which employs photoelectric means.

It is an additional object of the present invention to provide a device of the type stated for measuring the specific gravity of liquids and solutions which is light in weight, compact in size, and rigid in construction, so that it can withstand considerable abuse.

It is also an object of the present invention to provide a device of the type stated employing a photoelectric transducer having unique linearity of response so as to be extremely well adapted to measuring and similar functions.

With the above and other objects in view, our invention resides in the novel features of form, construction, arrangement, and combination, of parts presently described and pointed out in the claims.

In the accompanying drawings:

FIG. 4 is a fragmentary sectional view taken along line 4—4 of FIG. 3;

FIG. 5 is a vertical sectional view taken along line 5—5 of FIG. 3;

FIG. 6 is a schematic view of the electrical circuitry forming part of the present invention.

Figure 1:
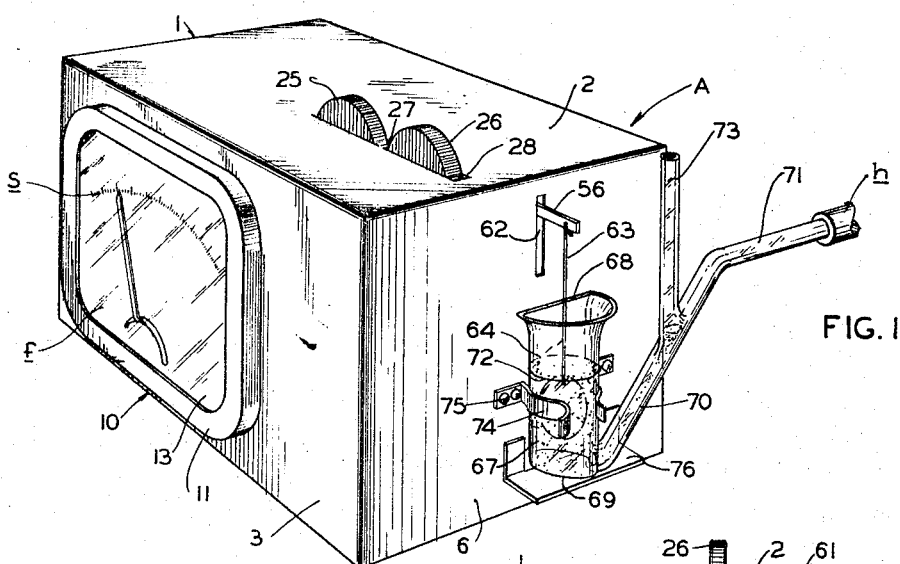
FIG. 1 is a perspective view of the device for measuring specific gravity constructed in accordance with and embodying the present invention.
Figure 7:
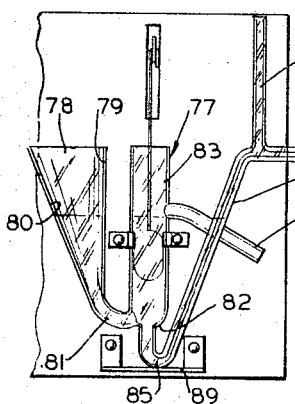
FIG. 7 is a fragmentary and elevational view of a modified form of sample-vial forming part of the present invention.

Generally speaking, the means for measuring the specific gravity of liquids and solutions of the present invention comprises a device having a balancing mechanism which suspends a bob in a vial of the liquid, the specific gravity of which is to be determined. The balancing mechanism is calibrated with the bob suspended in pure water, and has a blade of similar element which is interposed between a photoelectric cell and a lamp so that deflection of the balancing mechanism will expose more or less of the area of the photoelectric cell. The cell will then transmit a current, the amperage of which is directly proportional to the area exposed to light from the lamp. It is, of course, understood that the light should be of constant intensity. The photoelectric cell is connected across potentiometers for balancing the electrical circuit and thereby calibrating the device. Also operatively connected in the circuit is a galvanometer which is graduated to give a direct reading of specific gravity.

The vial of the present invention which holds the liquid is provided with a pair of tubes, one of which vents to the atmosphere and the other of which is connected to an aspirator for constantly maintaining a selected liquid level within the vial.

Referring now in more detail and by reference characters to the drawings which illustrate a preferred embodiment of the present invention, A designates a device for measuring the specific gravity of liquids and solutions comprising an outer housing 1 including a top wall 2, front and rear walls 3, 4 and transverse side walls 5, 6, respectively. Removably secured to the underside of the housing 1 by means of bolts 7, is a removable bottom wall 8 which is provided on its undersurface with a plurality of depending rubber feet 9. The housing 1 is preferably formed from any light weight metal, such as aluminum, or can be conveniently molded from a suitable synthetic resin such as high-impact polystyrene.

The front wall 3 is suitably apertured to accommodate a galvanometer 10 which is actually a micro-ammeter and includes an outer casing 11 and terminal posts 12, 12'. The meter 10 is provided with a face $f$ having a scale $s$ reading directly in terms of specific gravity. The outer casing 11 is provided with a glass cover 13 and is secured to the front wall 3 through a plurality of spaced bolts 14. The internal construction of the meter 10 is conventional and is, therefore, neither illustrated nor described in detail herein. The electrical connections, by which the meter 10 is connected to the other electrical components, are held on the terminal posts in the usual manner by nuts 15, 15'.

The bottom wall 8 is integrally formed with an upstanding intermediate wall 16 which extends halfway across the bottom wall 8 for supporting two balancing potentiometers 17, 18, respectively. The potentiometers 17, 18, are respectively provided with shafts 19, 20, which are journaled in the intermediate wall 16 and retentively held in place by means of lock washers 21, 22, and lock nuts 23, 24, respectively. The other ends of the shafts 19, 20, are provided with adjusting wheels 25, 26, which project segmentally through slots 27, 28, respectively formed in the top wall 2.

Bolted or otherwise rigidly secured upon the upper surface of the bottom wall 8 is a transformer 29 having a secondary coil 30 and a primary coil 31 and which is, in turn, connected to a suitable source of electrical current (not shown) through a cord set 32. Connected in parallel across the primary coil 31 in the manner as shown in FIG. 6 is a pair of neon tubes 33, 34, and connected in series with the primary coil 31 is a resistor 35. Through this construction, it is possible to provide a substantially constant current supply to the primary coil 31 and obtain a correspondingly constant voltage output from the secondary coil 30.

Integrally formed with the interior face of the rear wall 4 and extending inwardly for its entire length is a rail or bead 36 for slidably supporting a light proof housing 37 which includes a bottom wall 38, front and rear walls 39, 40, and a pair of transverse side walls 41, 42. The rear wall 40 is integrally formed with a rectangular notch 43 for snugly but slidably energizing the rail 36 and is rigidly held in place within the housing 1 through a plurality of spaced screws 44, as can best be seen in FIG. 4. The light proof housing 37 is integrally provided with spaced parallel intermediate wall 45 which extends between the transverse walls 41, 42, and divides the housing 37 into front and rear compartments 46, 46'. By further reference to FIG. 4, it can be seen that a light-tight gasket 47 is interposed between the undersurface of the top wall 2 and the upper margins of the housing 37 and intermediate wall 45, thereby maintaining the two compartments 46, 46', in a light-tight condition, for reasons which will presently more fully appear. The rear compartment 46' is, in turn, sub-divided by two transverse walls 48, 48', into three chambers 49a, 49b, 49c, the middle compartment 49b being filled almost to the top with a silicone liquid or dampening fluid. The housing 37 may be formed from a light weight metal such as aluminum or may be conveniently molded from a synthetic resin or plastic material such as polyvinyl chloride.

Rigidly mounted on the upper surface of the bottom wall 38 and being located within the rear compartment 46' is a light socket 50 which is provided with a removable light bulb 51, the latter being electrically connected to one terminal of the secondary coil 30 and to a center tap 52 on the second coil 30. By reason of the operation of the neon tubes 33, 34, the voltage output of the secondary 30 is maintained substantially constant and, therefore, the light bulb 51 will have a substantially constant intensity. Rigidly mounted within the front compartment 46 is a photoelectric cell 53 such as a selenium cell or silicon cell which is in approximate horizontal alignment with the bulb 51. The wall 45 is provided with a narrow vertical slit 54 located in the direct line of light passage between the bulb 51 and photoelectric cell 53. Mounted upon the intermediate wall 45 in overlying relation to the slit 54 is a red-filter 55 for passing only rays of monochromatic red light of constant intensity which will, in turn, energize the photoelectric cell 53. This photoelectric cell 53 has a linear response to light in the sense that the amperage transmitted by the cell 53 is directly proportional to the area exposed to the constant-intensity light emitted by the bulb 51.

The amount of light which passes through the slit 54 and energizes the cell 53 is regulated by a spring biased arm or beam 56, preferably formed of spring metal such as copper-beryllium, and rigidly secured to a boss 57 which is formed integrally with the side wall 41 and extends inwardly into the compartment 46'. The balancing arm 56 has a relatively flat horizontal portion 58 which is secured to the boss 57 by means of screws 59 and is provided with sufficient internal resiliency so that it can shift back to its original position after it has been urged to an upper or lower position. Intermediate its ends, the arm 56 is provided with a downwardly extending U-shaped bight 60 that dips down into the damping fluid with compartment 49b. Near its outer or free end, the balancing arm 56 is twisted through 90° to a vertical flat blade 61 which swings in a vertical plane across the slit 54 and, therefore, regulates the amount of monochromatic light which strikes the light sensitive cell 53. The outer end of the blade 61 extends through an elongated slot 62 formed within the side wall 6 and secured to the outermost end of the blade 61 is a very thin wire 63 provided at its lower end with a bob 64.

The balancing potentiometer 17 has one terminal connected through a fixed resistor 65 and a diode 66 to one terminal of the secondary coil 30. The light bulb 51, the balancing potentiometer 17, the balancing potentiometer 18, the meter 10, and the light sensitive cell 53 are all electrically connected as schematically shown in FIG. 6.

Figure 2:
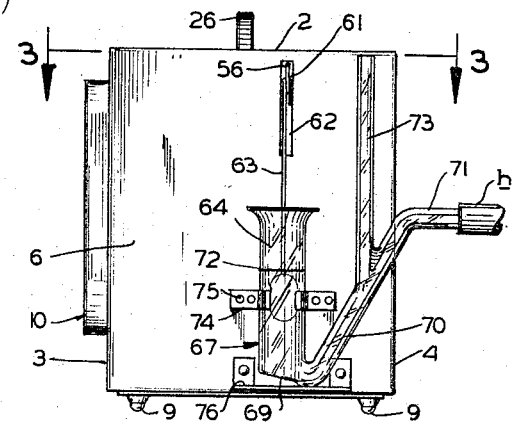
FIG. 2 is an end elevational view of the device of FIG. 1.
Figure 3:
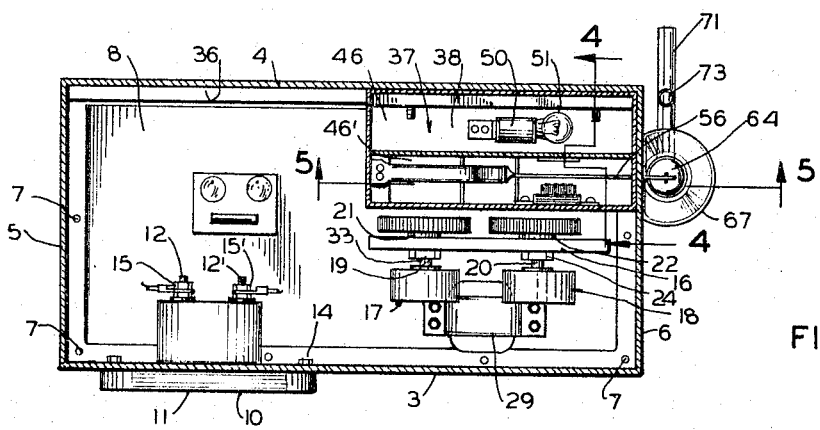
FIG. 3 is a horizontal sectional view taken along line 3—3 of FIG. 2.

The bob 64 is disposed within a vial 67 adapted to receive the liquid as to which the specific gravity is to be determined. The vial 67 has a relatively flat inner surface 68 which abuts the exterior face of the side wall 6 and has a downwardly inclined bottom wall 69 which integrally merges into an outwardly extending vacuum tube 70, substantially as shown in FIGS. 1 and 2. The tube 70 extends outwardly from the vial 67 at approximately a 45° angle with respect thereto and integrally merges into a horizontal tube 71. By reference to FIG. 2, it can be seen that the horizontal tube 71 lies in a horizontal plane which is located slightly below the upper margin of the vial 67 so as to prevent any overflow in the vial 67. As the liquid would seek its own level, it would drain through the horizontal stem 70 rather than overflow the upper margin of the vial 67. The vial 67 is further provided with a scratch mark or liquid level line 72 for convenience of adjustment, and connected to the vacuum tube 70 in the same horizontal plane as the level line 72 is a vent tube 73 which joins the tube 70 in a Y-connection, substantially as shown in FIG. 2. Also, as may be seen in FIG. 2, the mouth of the tube 73 is located in a plane which is substantially higher than the upper margin of the vial 67 or the horizontal tube 71, the latter being connected by a hose h to a conventional aspirator or other source of suction (not shown).

The wire 63, which is preferably formed of a very fine-drawn platinum, will suspend the bob 64 in the liquid. For each liquid of different specific gravity, the bob 64 will seek a different level thereby producing a different amount of deflection in the blade 61. Since the wire 63 is of very small diameter, the surface-tension effect and other errors are substantially eliminated when the latter is immersed to different depths for various different specific gravity readings. The vial 67 is retentively held against the side wall 6 through a pair of resilient clamps 74 which is secured to the side wall 6 through screws or similar fasteners 75. The bottom of the vial rests upon a shelf-like support bracket 76 whereby the vertical height or position of the vial 67 is established at a predetermined level in relation to the bob 64. It will, of course, be evident that this can be done either by adjusting the vertical position of the vial 67 or the length of the wires 63, the important consideration being that the bob 64 be so located that it will always be fully immersed when the vial 67 is filled up to the level line with liquid, regardless of the degree of deflection in the blade 61.

The specific gravity measuring device A can be assembled by removing the bottom wall 8 from the housing 1, inserting the light-proof housing 37 in through the open bottom, and toward the left side wall 5. The housing 37 is forced upwardly until its upper margin abuts the undersurface of the top wall 2 and the rail 36 engages the notch 43. The housing 37 is then slid along the rail 36 until the balancing arm 56 extends outwardly through the elongated slot 62 and the side wall 42 abuts the interior surface of the rear wall 4 of the housing 1. The housing 37 is then secured in place through the screws 44. The volt meter 10 is secured to the casing 11 by means of the bolts 14. Next, the transformer 29 is secured to the upper surface of the bottom wall 8 and the voltage regulator system 33 is similarly secured to the bottom wall 8 in close proximity to the transformer 29. The balancing potentiometers 17, 18, are secured to the intermediate wall 16 by inserting the shafts 19, 20, through the intermediate wall 16, securing the lock washers and nuts 21, 22, 23, and 24, respectively. The adjusting dials 25, 26, will project upwardly through the apertures 27, 28, formed in the top wall, when the bottom wall 8 is secured to the housing 1 through the bolts 7. It will, of course, be understood that the electrical components are connected electrically according to FIG. 6.

In use, the specific gravity measuring device A is connected to any suitable source of electrical current by means of the cord set 32 and the primary coil 31, thus energized. This will, in turn, induce the voltage in the secondary coil 30. It should be noted that the center tap 52 on the secondary coil 30 serves as a voltage divider and approximately half of the voltage is impressed across the light bulb 51, while the whole voltage is impressed across the whole secondary coil 30 which connects to the circuitry associated with the light sensitive cell 53.

The horizontal tube 71 which, as above noted, is connected to an aspirator or other suitable source of suction, will suck liquid out of the vial 67 whenever the level rises above the Y-connection. Therefore, when liquid is poured into the vial 67, the correct level is automatically assured. This eliminates any possibility of manipulative error in filling the vial 67 and, in fact, makes this particular phase of the operation both simple and rapid. It will be noted that, when the liquid level has dropped to the level of the Y-connection, the aspirator will thereafter suck air.

The beam or arm 56 and circuit is calibrated with the bob 64 immersed in distilled water. In other words, when the bob 64 is immersed in pure water, the beam or arm 56 is adjusted so that the vertical blade 61 approximately covers the slit 54. At this point, the potentiometers 17, 18, are adjusted so that the indicating needle rests at the initial scale mark 1.0, which, of course, is the specific gravity of water.

When measuring the specific gravity of another liquid, such liquid is poured into the vial 67 until it reaches the liquid level established by the juncture between tubes 71 and 73. The bob 64 which is secured to the beam or arm 56 by the platinum wire 63 will then be fully immersed in the liquid, and will assume a relative vertical position directly dependent upon the specific gravity of the liquid. This will produce a corresponding deflection of the blade 61 and proportionally vary the area of the cells, which is accordingly exposed to monochromic red light, and the reading on the volt meter 10 will then directly indicate the correct specific gravity of the liquid.

It is also possible to provide a modified form of vial 77 which is formed preferably of glass and integrally includes a somewhat conical reception vessel 78 having one side 79 somewhat vertical and the other side 80 angular. At its lower end, the reception vessel tapers into a downwardly and laterally curved tubular neck 81 which opens into the side of the rounded bottom 82 of a cylindrical bob-receiving vessel 83. A short distance down from the top, this latter vessel 83 is provided with a laterally opening side-arm tube 84 which acts as an overflow and level-establishing element and is connected preferably by a rubber hose (not shown) to a sink or drain. The rounded bottom 82 also opens downwardly into a U-bend 85 which integrally joins an angularly upwardly extending side-tube 86 having a capillary bore. At its upper end, the side-tube 86 integrally joins a horizontal tube 87 having a vertical vent tube 88. The side tube 86 is connected to a source of suction in the same manner as the tube 71. It has been found that the vials of this configuration are uniquely free of bubbles and entrapped air which might cause error. The vertical portion of the vial 77 is established by a shelf-like bracket 89 which is substantially similar to the bracket 76.

It should be understood that changes and modifications in the form, construction, arrangement, and combination of the several parts of the means for measuring the specific gravity of liquids and solutions, may be made and substituted for those herein shown and described without departing from the nature and principle of our invention.

Having thus described our invention, what we claim and desire to secure by Letters Patent is:

1. A device for measuring the specific gravity of liquids, comprising: a housing including a generally light-proof enclosure; a liquid holding container mounted on the outside of said housing for retaining a liquid to be measured; a beam movably mounted within said housing, having an end portion which extends outside the housing adjacent said container, at least a part of said beam being located within said enclosure; a bob suspended from said end portion of said beam so as to be immersed in the liquid in the container, the liquid deflecting the bob and the beam in proportion to the specific gravity of the liquid; a light source contained within said enclosure; means for maintaining the light from said light source substantially constant; a photoelectric cell having an electrical output dependent on the light impinging thereon, said cell being mounted within said enclosure; light screening means mounted within said enclosure between said cell and said light source and having an aperture formed therein exposing said cell to light from said light source; said part of said beam having means extending adjacent and across said aperture for varying the area of the aperture which is open to the passage of light in proportion to the deflection of said beam; indicating means mounted on said housing for producing a reading proportional to an electrical input thereto; and circuit means connecting said cell to said indicating means to cause said reading to directly indicate the specific gravity of the liquid being measured, including adjustable calibration means at least partly extending outside said housing for setting said indicating means to a predetermined specific gravity reading when said bob is suspended in a reference liquid of known specific gravity.

2. The specific gravity measuring device of claim 1 wherein said liquid holding container comprises a self-leveling liquid vial including a first upwardly extending tube for retaining the liquid to be measured and into which said bob is suspended, a second tube having a lower portion intersecting said upwardly extending tube and an upper portion with a generally enlarged liquid reception vessel for filling the upwardly extending tube with the liquid to be measured, and venting tube means having a lower portion connected to the lower end of said upwardly extending tube and an upper portion branching into a first tube portion vented to the atmosphere and a second tube portion adapted to be connected to an aspirator.

3. A device for measuring the specific gravity of liquids, said device comprising an outer housing, a cantilever beam having a free end and rigidly mounted at the other end in said housing, said mounted end having a flat rectangular cross section, said beam being U-shaped for a portion of its length, said U-shaped section being partially immersed in a damping fluid, a liquid container operatively associated with said device for retaining a liquid of which the specific gravity is to be determined, a bob operatively attached to the free end of said cantilever beam whereby to cause said beam to deflect, said bob being immersed in said container of liquid so that the deflection of the beam is a measure of the specific gravity of the liquid in the container, a constant intensity source of light operatively mounted in said housing, a photoelectric element operatively mounted in said housing and having a linear quantitative response directly proportional to the area thereof exposed to the light from the light source, a shutter-like element carried by and forming a part of the beam, said element being interposed between said source of light and said photoelectric element whereby a portion of the photoelectric cell will be illuminated, the area of which portion is proportional to the deflection of the beam so that said photoelectric element will emit an electrical current proportional to the amount of deflection of said beam and thereby provide a measure of the specific gravity of the liquid being tested, and indicia means operatively mounted in said outer housing and being operatively connected to said photoelectric element for indicating the specific gravity of said liquid.

4. A device for measuring the specific gravity of liquids as claimed in claim 3 in which said beam is twisted between the U-shaped section thereof and its free end so as to retain the same horizonal longitudinal axis as the rigidly secured end and yet present the flat face thereof in a plane perpendicular to the plane of the flat face of the rigidly secured end and said twisted portion of said beam is said shutter-like element.

5. A device for measuring the specific gravity of liquids, comprising: a support; a beam movably mounted on said support; a self-leveling liquid vial associated with said support and including a first upwardly extending tube for retaining a liquid to be measured, a second tube having a lower portion intersecting said upwardly extending tube and an upper portion with a generally enlarged liquid reception vessel for filling the upwardly extending tube with the liquid to be measured, and venting tube means having a lower portion connected to the lower end of said upwardly extending tube and an upper portion branching into a first tube portion vented to the atmosphere and a second tube portion adapted to be connected to an aspirator; a bob operatively attached to said beam and suspended therefrom into said upwardly extending tube so as to be immersed in said liquid, the deflection of said beam being a measure of the specific gravity of said liquid; a photoelectric cell having an electrical output proportional to the total illumination thereof; light generating means having a light path optically aligned with said photoelectric cell; a part of said beam having means extending into the optically aligned light path for varying the illumination on said photoelectric cell in proportion to the deflection of said beam; and means electrically connected to said photoelectric cell and responsive to the electrical output therefrom for directly indicating the specific gravity of the liquid being measured.

6. The specific gravity measuring device of claim 5 wherein said vial further includes a second venting tube intersecting the upwardly extending tube at a level at which the liquid therein is to be maintained.

References Cited
UNITED STATES PATENTS

| | | |
|---|---|---|
| 1,792,046 | 2/1931 | Skaupy. |
| 1,992,199 | 2/1935 | Fitz Gerald. |
| 2,397,038 | 3/1946 | Obenshain et al. |
| 2,635,461 | 4/1953 | Groth et al. |
| 3,061,027 | 10/1962 | Berge et al. _____ 177—194 |

DAVID SCHONBERG, *Primary Examiner.*

LOUIS R. PRINCE, *Examiner.*

D. O. WOODIEL, *Assistant Examiner.*